United States Patent
Yasui

[11] Patent Number: 5,941,446
[45] Date of Patent: Aug. 24, 1999

[54] SPF/DB AIRFOIL-SHAPED STRUCTURE AND METHOD OF FABRICATION THEREOF

[75] Inventor: Ken K. Yasui, Huntington Beach, Calif.

[73] Assignee: McDonnell Douglas Corporation, Huntington Beach, Calif.

[21] Appl. No.: 08/890,824

[22] Filed: Jul. 10, 1997

[51] Int. Cl.⁶ ..................................................... B23K 31/02
[52] U.S. Cl. .......................... 228/157; 228/181; 29/889.72
[58] Field of Search ..................................... 228/157, 181; 29/889.72

[56] References Cited

U.S. PATENT DOCUMENTS

| | | |
|---|---|---|
| 3,002,265 | 10/1961 | Stalker . |
| 3,135,486 | 6/1964 | Wing . |
| 3,645,481 | 2/1972 | Purdy . |
| 4,204,358 | 5/1980 | Briggs . |
| 4,217,397 | 8/1980 | Hayase et al. . |
| 4,284,443 | 8/1981 | Hilton . |
| 4,304,821 | 12/1981 | Hayase et al. . |
| 5,115,963 | 5/1992 | Yasui ....................... 228/157 |
| 5,129,248 | 7/1992 | Yasui . |
| 5,141,146 | 8/1992 | Yasui ....................... 228/157 |
| 5,240,376 | 8/1993 | Velicki . |
| 5,330,092 | 7/1994 | Gregg et al. . |
| 5,330,093 | 7/1994 | Bottomley et al. . |
| 5,344,063 | 9/1994 | Johnston et al. ......... 228/157 |
| 5,384,959 | 1/1995 | Velicki . |
| 5,431,327 | 7/1995 | Dunford et al. ......... 228/157 |

*Primary Examiner*—Geoffrey S. Evans
*Assistant Examiner*—Jeffrey T. Knapp
*Attorney, Agent, or Firm*—Harness Dickey & Pierce P.L.C.

[57] ABSTRACT

An airfoil-shaped structure having a continuous, seamless, structurally reinforced, leading edge is fabricated using a superplastic forming/diffusion bonding process which results in a simpler and more cost effective structure. The airfoil-shaped structure includes a core assembly having welded together core sheets and a facial component being defined by a face sheet having a 180° bend therein so that the two face sheet ends are aligned. To fabricate the airfoil-shaped structure the core assembly is inserted inside the facial component, thereby forming an intermediate assembly having a plurality of cells. The intermediate assembly is inserted into a die cavity, after which the airfoil-shaped structure, having predetermined design characteristics, is superplastically formed by heating the die and selectively pressurizing the plurality of cells using only two forming pressures.

17 Claims, 7 Drawing Sheets

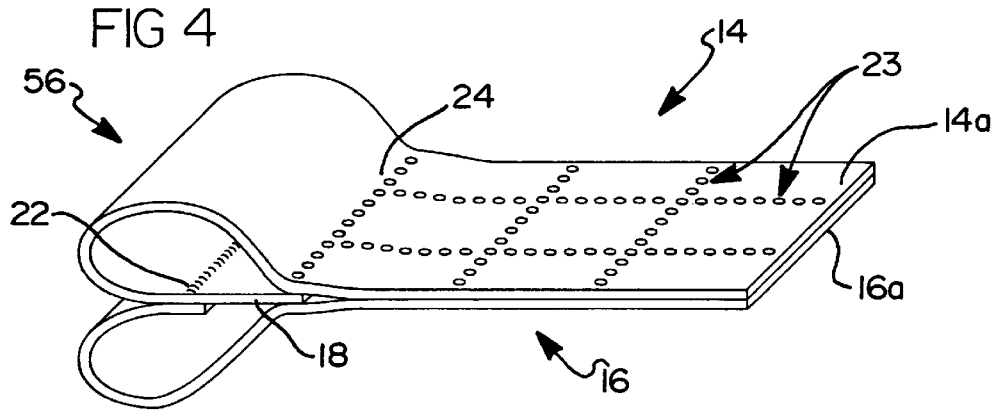
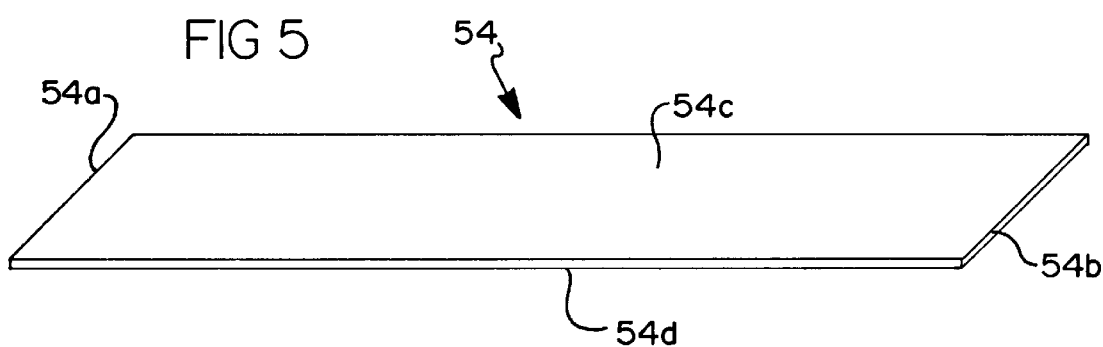
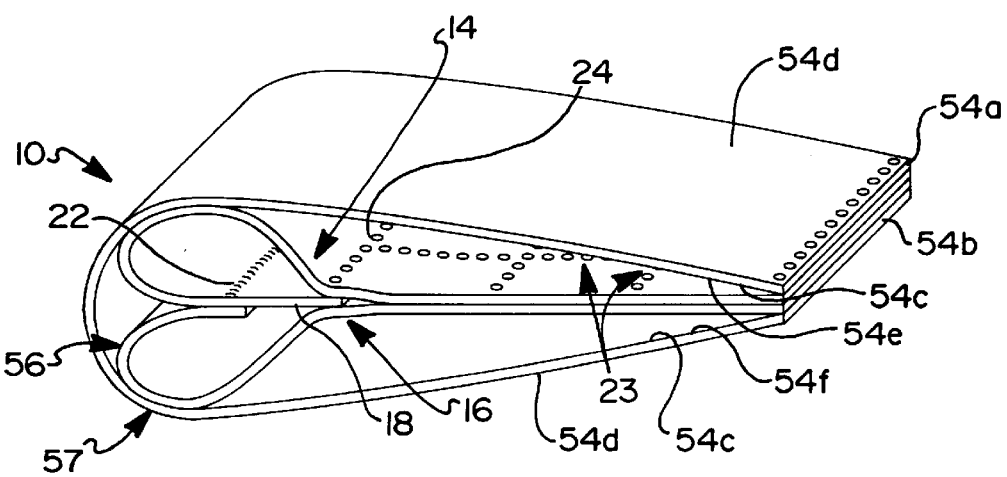

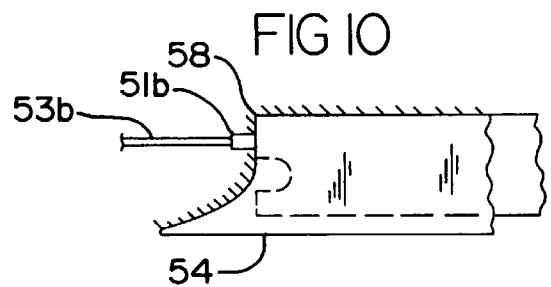
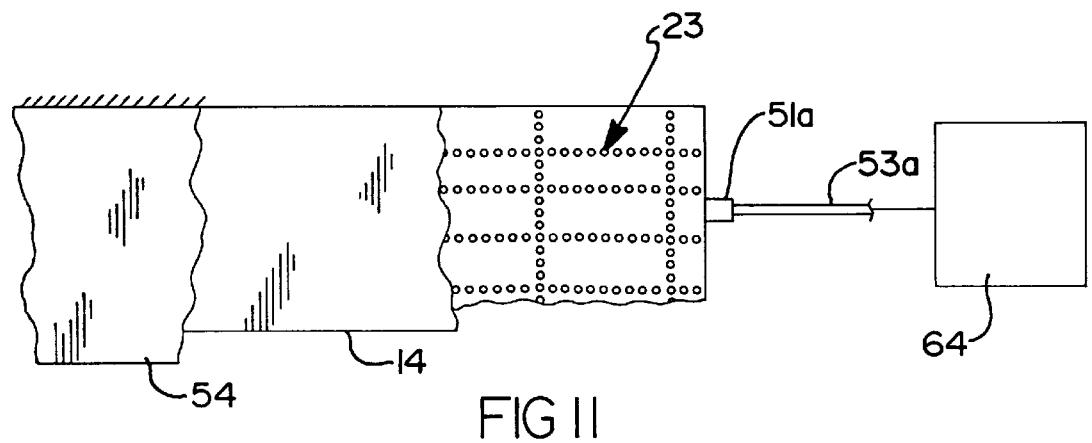
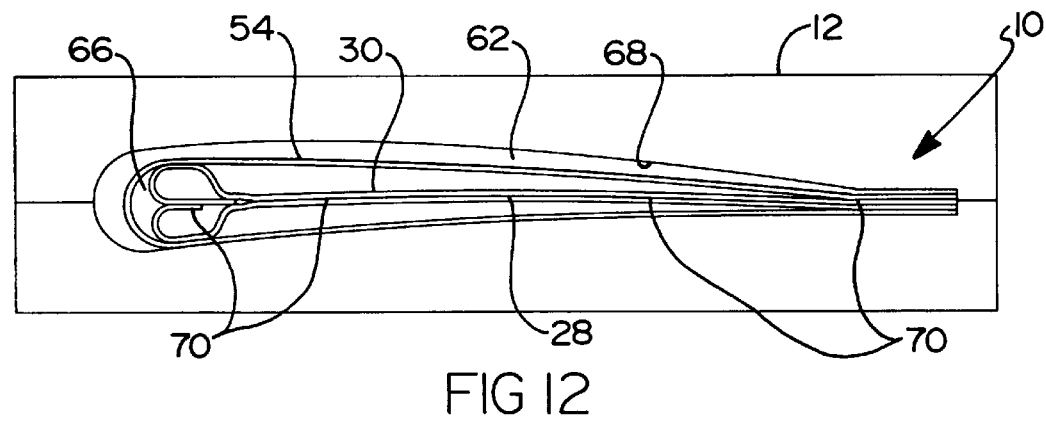

FIG 13
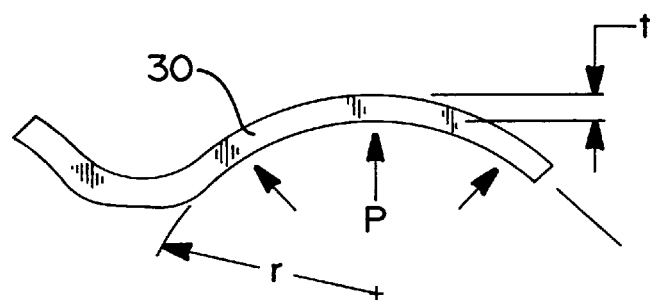
FIG 14
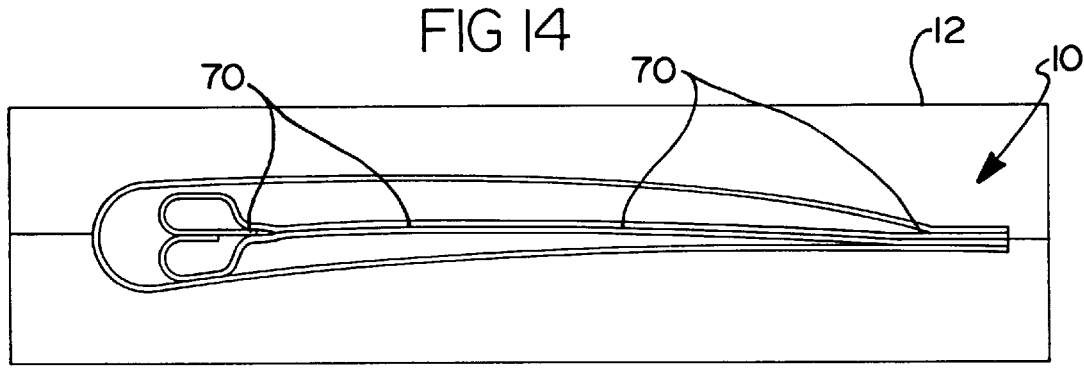
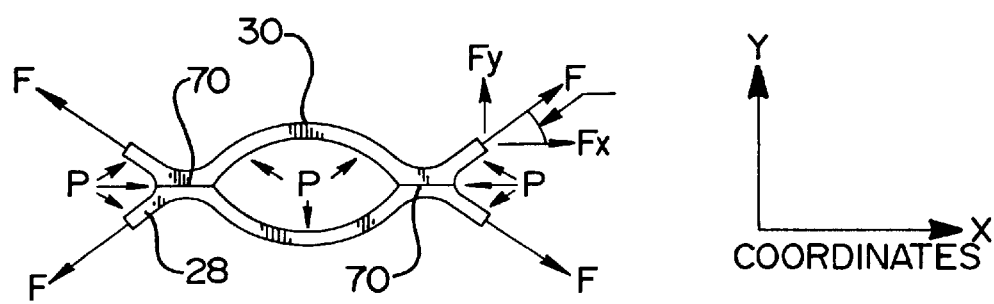
FIG 15

SPF/DB AIRFOIL-SHAPED STRUCTURE AND METHOD OF FABRICATION THEREOF

BACKGROUND OF THE INVENTION

1. Technical Field

The present invention relates generally to the production of airfoil-shaped structures and specifically to the production of a superplastically formed/diffusion bonded airfoil-shaped structure having a structurally reinforced, contoured leading edge.

2. Background Art

Certain metals and metal alloys develop unusually high tensile elongations with minimum necking when deformed within specific temperatures and specific strain rate ranges. This characteristic, known as superplasticity, is known in the art as applied to the production of complex shapes. It is also known in the art that at these superplastic forming temperatures the same metals and metal alloys can be diffusion bonded with the application of pressure contact surfaces. A well known superplastic forming process is disclosed in U.S. Pat. Nos. 4,217,397 entitled "Metallic Sandwich Structure and Method of Fabrication" which issued to Hayase et al. on Aug. 12, 1980; and 4,304,821 entitled "Method of Fabricating Metallic Sandwich Structure" which issued to Hayase et al. on Dec. 8, 1981. The patents disclosing this superplastic forming process, commonly known as the "four sheet process", have been assigned to the assignee of the present invention, and are herein incorporated by reference.

Techniques for superplastic forming and diffusion bonding (SPF/DB) airfoil-shaped structures having contoured leading edges typically have employed a conventional four sheet process. Using the four sheet SPF/DB process generally requires a cost and additional time required to remove (i.e., trim, fusion weld, grind and polish) the weld seam created across the leading edge.

It is further known in the art to produce structures having contoured leading edges by employing the SPF/DB process without the conventional four sheet process. Although a weld seam across the leading edge is not created with this process, it often requires controlling multiple forming pressures. Use for larger airfoil structures sometimes is limited with this process. Examples of this SPF/DB process are disclosed (and incorporated by reference herein) in U.S. Pat. Nos. 5,240,376 entitled "SPF/DB Hollow Core Fan Blade" which issued to Velicki on Aug. 31, 1993; and 5,384,959 entitled "Method of Making a SPF/DB Hollow Core Fan Blade" which issued to Velicki on Jan. 31, 1995, each of which is assigned to the assignee of the present invention.

DISCLOSURE OF INVENTION

The present invention provides a process for making an airfoil-shaped structure with a structurally reinforced, contoured leading edge. The invention finds particular utility for employing a SPF/DB process to produce such structures. The airfoil-shaped structure comprises a facial component and a core assembly. The process includes the steps of preparing the facial component and the core assembly, securing the core assembly within the facial component, and using the SPF/DB process to produce the desired airfoil-shaped structure.

The facial component includes a face sheet which has first and second ends and first and second surfaces. The face sheet is produced to have an approximately 180° bend therein so that the first and second ends are substantially aligned. Therefore, the first surface of the face sheet becomes the inner surface of the facial structure and the second surface of the face sheet becomes the outer surface of the facial structure.

The core assembly includes first and second core sheets. Each of the first and second core sheets has a leading and a trailing end, a first and a second side, and an upper and a lower surface. Each core sheet is produced to have an approximately 180° bend therein so that the leading ends of both core sheets are substantially aligned.

The process of the present invention capitalizes on the high tensile elongation potential of superplastic metals and metal alloys by disbursing gas pressure into a plurality of pressure-tight cells formed within the core assembly and the facial structure to form the superplastic core sheets and face sheet against a die having predetermined design parameters to produce the airfoil-shaped structure. The process of the present invention contemplates the use of only one core assembly forming pressure and one facial component forming pressure. By requiring only two forming pressures, the process of the present invention obviates the need for controlling multiple forming pressures and results beneficially in a low material strain at the reinforced leading edge.

The present invention contemplates having a contour-shaped leading edge structurally reinforced by an internal web. A center core section is created on the first core sheet by attaching an intermediate portion of the first core sheet to the trailing end of the second core sheet. The portion of the first core sheet between the intermediate portion and the trailing end defines the center core section. Once the core assembly and facial structure are prepared, and the face sheet and core section are superplastically formed against the airfoil-shaped die, the center core section thereby forms the structurally reinforcing internal web of the present invention.

In another aspect of the present invention, an airfoil-shaped structure is superplastically formed having a contoured leading edge, structurally reinforced by a plurality of internal webs. The present invention comprises the steps of preparing a facial component having a face sheet and a core assembly having sequentially attached first, second, and third core sheets. The leading end of the first core sheet is attached to an intermediate portion of the second core sheet; the leading end of the second core sheet is attached to an intermediate portion of the first core sheet; and the leading end of the third core sheet is attached to an intermediate portion of the second core sheet. The first and third core sheets are longer than the second core sheet and bent back approximately 180° to attach with the trailing end of the second core sheet. The three core sheets form the plurality of internal webs when the face sheet and core sheets are superplastically formed against the airfoil-shaped die.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from the following description and appended claims, taken in conjunction with the accompanying drawings.

BRIEF DESCRIPTION OF DRAWINGS

The present invention will become more fully understood from the detailed description and the accompanying drawings, wherein:

FIGS. 1–4 are perspective views showing sequentially the steps for preparing the core sheets which form the core assembly in a first embodiment of the present invention;

FIG. 5 is a perspective view showing the face sheet which forms the facial component of the present invention;

FIG. 6 is a perspective view showing the assembly of the present invention wherein the core assembly in a first embodiment is slid into the facial component;

FIG. 10 is a cross-sectional view showing details of the gas inlet arrangement into the face sheet and the outer core sheets of the intermediate assembly;

FIG. 11 is a cross-sectional view showing details of the gas inlet arrangement to the inner core sheets of the intermediate assembly;

FIG. 12 is a cross-sectional elevational view showing the assembled intermediate assembly within the forming die;

FIG. 13 is a diagrammatic view showing the pressurized cell geometry for a typical cell during the superplastic forming process of the present invention;

FIG. 14 is a cross-sectional elevational view similar to FIG. 12 showing the formation of the face sheet during the superplastic forming process of the present invention;

FIG. 15 is a diagrammatic view showing the core sheet force balance during the formation process of the present invention;

DETAILED DESCRIPTION OF THE INVENTION

It should be understood that the present invention will be described in connection with specific examples. However, it should be realized that the scope of this invention is not to be limited to this specific examples since the present invention has broad applicability to aerospace related components having rounded leading edges—not just to airfoil structures.

As indicate above, the material to be superplastically formed demonstrates the characteristics of unusually high tensile elongation with minimum necking when deformed within a limited temperature and strain rate range. While several materials demonstrate these superplastic properties, titanium and its alloys are currently the best known forming materials. The superplastic temperature range varies with the specific alloy used, however, the temperature just below the phase transformation temperature is near optimum. This temperature for titanium alloys is near 1700° F. The best strain rate is actually determined experimentally for each configuration formed, in order to produce balanced deformation. If the strain rate is too rapid, it may cause blowout during manufacturing of the material being deformed (resulting in undesired scrap during manufacturing), and if the rate is too slow, the material loses some of its plasticity.

In addition to the superplastic properties, the material to be formed must be suitable for diffusion bonding. Diffusion bonding, as used herein, refers to the solid state joining of the surfaces of similar or dissimilar metals by applying heat and pressure for a certain period of time to cause diffusion of atoms of the metals into the others' metal, effectively co-mingling of the atoms at the joint interface.

The inventive process for producing the airfoil-shaped structure of the present invention, disclosed herein, is an improvement of the SPF/DB process disclosed in U.S. Pat. No. 5,384,959, herein incorporated by reference, as noted above. The first step is to fabricate an intermediate assembly 10 for insertion into a die 12 (see FIG. 12). Then, the next step is to initiate the SPF/DB process, so that intermediate assembly 10 will be formed into an airfoil-shaped structure having the desired characteristics.

Intermediate Assembly Fabrication

Figure 1:
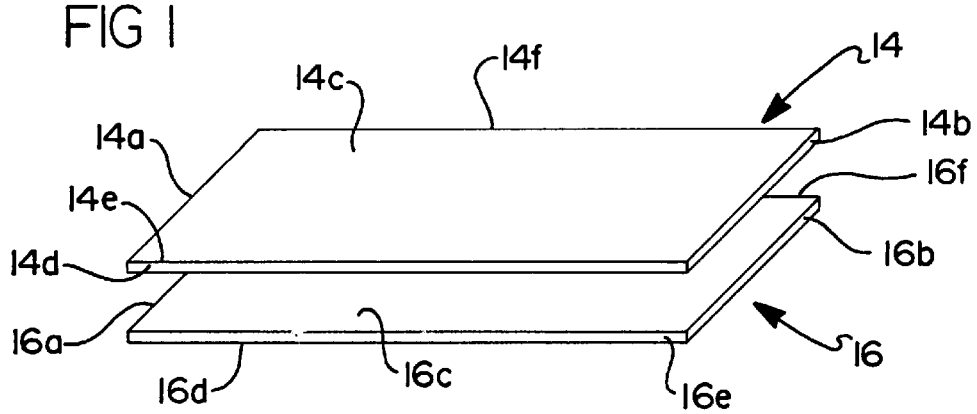
Figure 2:
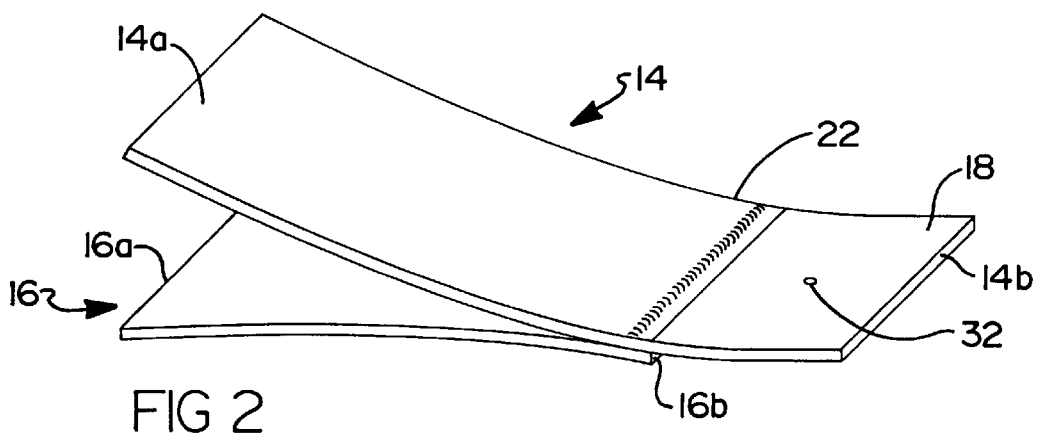

Intermediate assembly 10 comprises all of the structural members in their sheet metal form, and a series of gas inlet tubes that will be used to supply the gas pressure necessary for the subsequent forming operation. Referring to FIGS. 1–4, intermediate assembly formation is initiated by preparing a core assembly 56 which form a part of intermediate assembly 10. Two core sheets 14, 16, which in one embodiment comprise approximately 0.032 inch thick sheets of Ti-6-22-22 alloy, are trimmed to the proper perimeter dimensions for ensuring a resultant airfoil-shaped structure of the desired size. First core sheet 14 has leading and trailing ends 14a and 14b, respectively, as well as upper and lower surfaces 14c and 14d, respectively, and first and second sides 14e and 14f, respectively. Similarly, second core sheet 16 has leading and trailing ends 16a and 16b, respectively, as well as upper and lower surfaces 16c and 16d, respectively, and first and second sides 16e and 16f, respectively. Core sheets 14, 16 are cleaned and lower surface 14d is placed next to upper surface 16c for a roll-seam welding operation. A roll-seam weld 22 secures an intermediate portion of first core sheet 14 to trailing end 16b of second core sheet 16. The portion of first core sheet 14 between roll-seam weld 22 and trailing end 14b defines a center core section 18, as shown in FIG. 2. Once the structure is formed, center core section 18 becomes an internal structural web, reinforcing the leading edge of the airfoil-shaped structure of the present invention.

Figure 3:
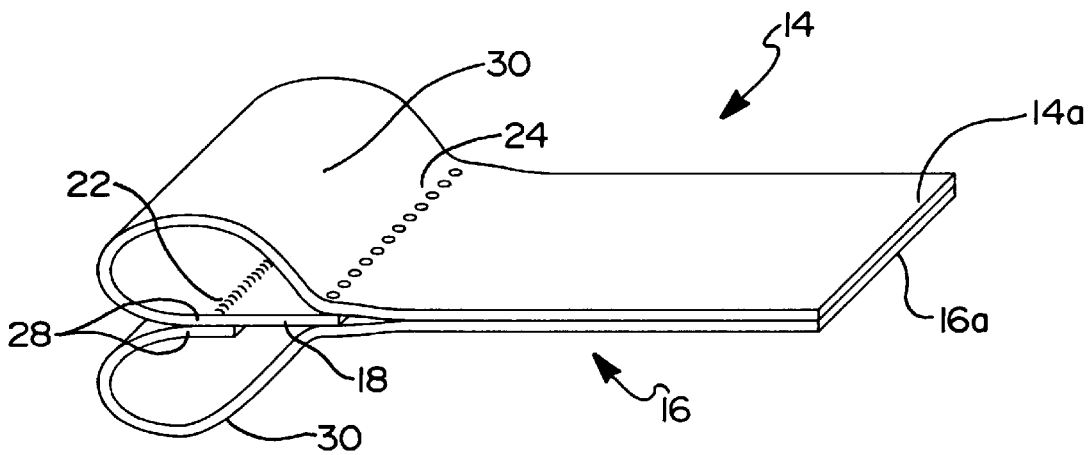

Referring now to FIG. 3, leading ends 14a, 16a of core sheets 14, 16, respectively, are each bent backwards approximately 180° such that leading ends 14a and 16a are aligned and in contact with one another. A connection such as (for example) a roll spotweld 24 secures core sheets 14 and 16 together with center core section 18 thereby forming a pair of loops, as shown. At this point, each core sheet 14, 16 comprises both an inner core surface 28 and an outer core surface 30. A grid pattern of intermittent spotwelds 23 is then rolled onto core sheets 14, 16 to further attach them together as shown in FIG. 4. A grid pattern of many configurations could be employed. The location of these welds dictates the final internal web geometry of the airfoil-shaped structure, as will be explained in further detail hereinbelow. After intermittent spotwelds 23 are completed, the perimeters of core sheets 14, 16 are continuously spotwelded, except at locations where gas inlets are to be installed, to provide a pressure-tight seal that will contain the core gases during forming.

Figure 7:
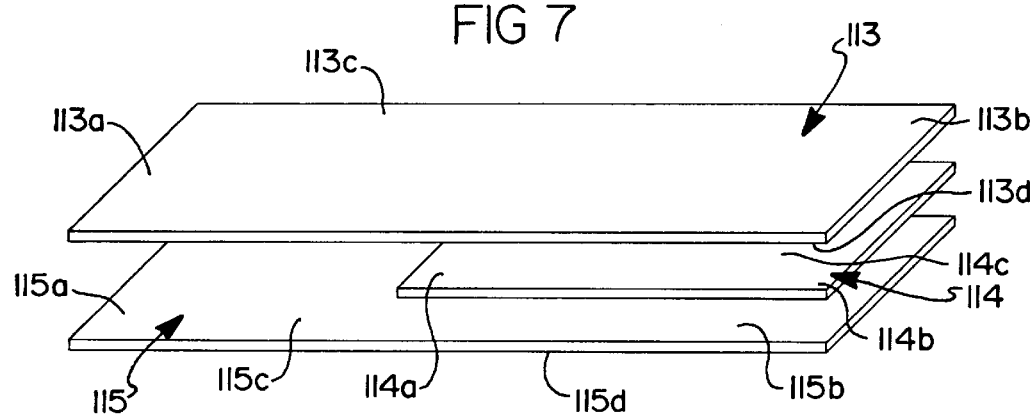
FIGS. 7–9 are perspective views showing sequentially the steps for preparing the core sheets which form the core assembly in a second embodiment of the present invention.
Figure 8:
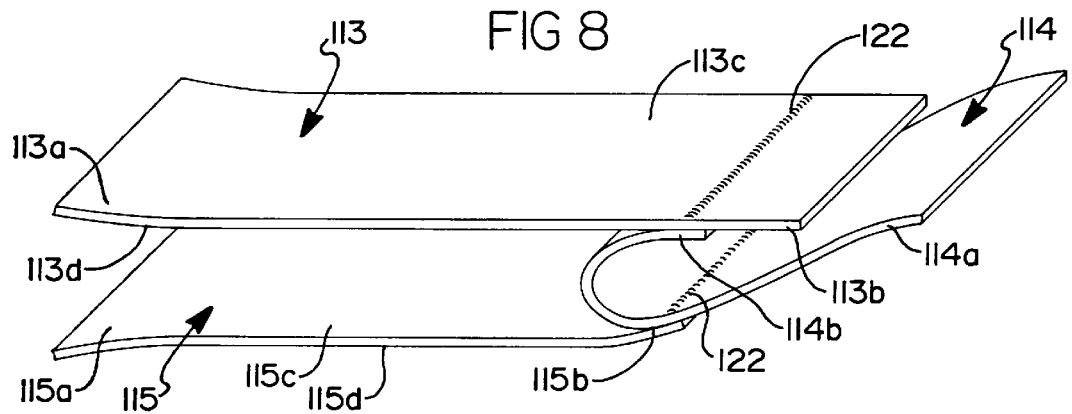
Figure 9:
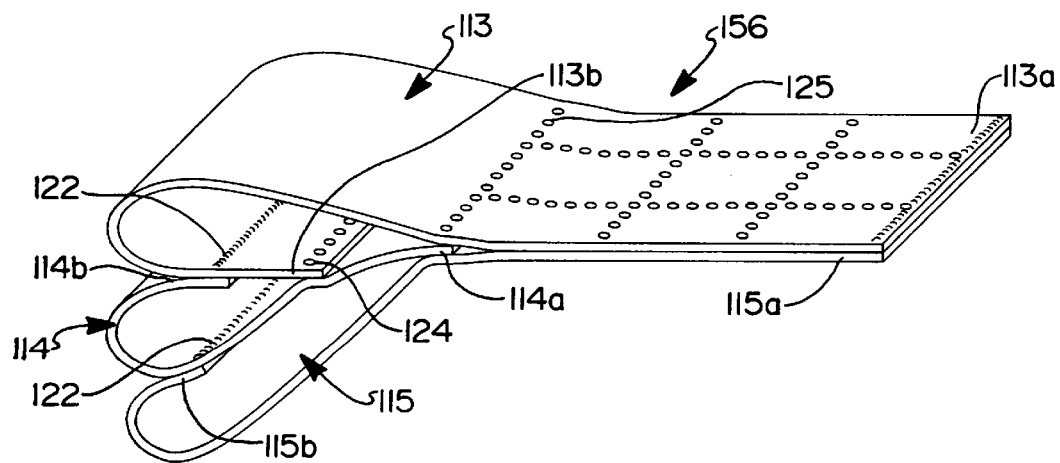

In another embodiment of the present invention, the airfoil-shaped structure of the present invention can be seen which is identical in all respects with that of FIGS. 1–6 except as described and shown herein. Each of the elements in FIGS. 7–9, corresponding to equivalent elements in FIGS. 1–6, are designated by the same reference numeral, preceded by the numeral 1. Thus, a modified core assembly 156 is prepared having three core sheets 113, 114, 115. However to further improve the structural integrity of the leading edge of the airfoil-shaped structure of the present invention, multiple internal structural webs are formed. To do this, a lower surface 113d of a first core sheet 113 is placed next to an upper surface 114c of a second core sheet 114 and an upper surface 114c of the second core sheet 114 is placed next to an upper surface 115c of a third core sheet 115, for a roll-seam welding operation therebetween. Roll-seam welds 122 secure an intermediate portion of the first core sheet 113 to a trailing end 114b of the second core sheet 114, and an intermediate portion of the upper surface 114c of the second core sheet 114 to a trailing end 115b of the third core sheet 115. FIG. 9 shows the leading ends 113a and 115a of first and third core sheets 113 and 115, respectively, bent backwards approximately 180° such that the leading ends 113a and 115a are aligned and in contact with one another. A roll-spotweld seam 124 secures the trailing end 113b of the first core sheet 113 to an intermediate portion of the second core sheet 114. A roll-spotweld seam 125 also secures the leading end 114a of the second core sheet 114 to an intermediate portion of the upper surface 113c of the first core sheet 113 and to an intermediate portion of a lower surface 115a of the third core sheet 115 thereby forming loops in core sheets 113, 114, and 115. Once the structure is formed via the SPF/DB process of the present invention, portions of the welded core sheets create multiple internal structural webs, which further reinforce the leading edge of the airfoil-shaped structure of the present invention.

A gas inlet 32 is installed in core sheet 14, as shown in FIG. 2. Referring now to FIG. 11, a small titanium fitting 51a for the gas inlet 32 is used to spread core sheets 14, 16 apart to provide a gas passage. Onto this fitting a titanium tube (not shown) is fusion welded to connect the intermediate assembly 10 and a gas source. A steel tube 53a is then used as a collar to prevent the titanium tube from expanding under the gas pressure during the hot forming operation. Once the edges of the area around the titanium fitting 51a and the core sheets 14 and 16 are sealed by fusion welding the sheets together, the core sheets 14, 16 are leak checked to insure that they are pressure-tight.

Assembly of the core sheets 14, 16 for forming the core assembly 56 is essentially complete at this stage, and preparation of a facial component 57 may now begin. In one embodiment, a face sheet 54 shown in FIG. 5 is sheet of Ti-6-22-22 alloy, which is trimmed to the proper dimensions and mechanically bent at the sheet centerline 180° so that the first and second ends 54a and 54b of the face sheet 54 opposite of the bent radius line are aligned, as shown in FIG. 6. The face sheet 54 has a first, or inner, surface 54c and a second, or outer, surface 54d. Due to the material springback effects, the ends 54a, 54b will have a tendency to open, but this is not a problem. Once formed, the face sheet 54 should be etched appropriately to provide a suitably clean surface for bonding. The core assembly 56 may now be placed inside the face sheet 54, as shown in FIG. 6, so that the trailing ends 14b, 16b of the core sheets 14, 16, respectively, and first and second ends 54a, 54b of face sheet 54 all line up. Once assembled, the first core sheet 14 is bonded to a first portion 54e of the face sheet inner surface 54c, while the second core sheet 16 is bonded to a second portion 54f of the face sheet inner surface 54c. The face sheet inner surface portions 54e and 54f oppose one another. The periphery of the now assembled intermediate assembly 10 is then welded closed in order to provide a sealed bladder that contains the sealed core assembly 56 within it. To accomplish this, the edges of the intermediate assembly 10 are fusion welded together except at the gas inlet location for face sheet 54, the fusion welded edge 58 being shown in FIG. 10. The gas inlet for the face sheet 54 is installed in a manner similar to that of the core sheet 14, including a titanium fitting 51b and a steel tube 53b. Gaps around the face sheet gas inlet must also be carefully welded to seal the pressures of face sheet 54. The entire intermediate assembly 10 can now be leak checked to verify the integrity of the welding. Once the intermediate assembly 10 is pressure-tight, it can be certified as completed and placed into the steel die 12 for the hot forming operation (see FIG. 12).

Hot Forming Operation

During the hot forming operation, the titanium alloy sheets are superplastically formed into the final part geometry. This is accomplished by placing intermediate assembly 10 inside a cavity 62 within the steel die 12. The die 12 is then placed inside a heated platen press (not shown). By controlling the pressure, temperature and the relative time at each of these variables, the formation of the structure can be dictated by the weld patterns of intermittent spotwelds 23 imposed on the sheets of the intermediate assembly 10. Forming takes place by pressurizing the individual bladder systems, or cells, within the intermediate assembly 10. The forces generated on the heated titanium alloy sheets cause them to expand and elongate until they fill the cavity 62, coming in contact with the tool surface. Flow stresses of the sheets are controlled as a function of the gas pressure feed to the gas inlets and by the temperature inputs to the tool. By following a mathematically determined schedule for manipulating the gas pressure and die temperature as a function of time, the internal geometry of the airfoil-shaped structure can be controlled within the material's superplastic limits.

The gas management system for core sheets 14, 16 and face sheet 54 is a rather complex network. A similar gas management system is disclosed in U.S. Pat. No. 5,129,248, herein incorporated by reference. Each of the cells mentioned above must form at different rates relative to one another. A gas source supplies a gas (preferably welding grade argon gas because it is inert and to avoid contaminating the titanium, which may be highly reactive at elevated temperatures) to a gas management unit 64. Gas management unit 64 acts as a control unit for directing gas flow through pressure regulators to the respective cells. The gas management unit 64 may comprise any known control means for selectively directing gas flow to each of the pressure regulators on a time-dependent basis, in accordance with the control parameters set forth in detail below.

The fundamental equation that governs the forming rate for each of the individual cells is simply the hoop stress equation modified to account for the transient nature of superplastic forming, where the cell radius r and the material thickness t are constantly changing with respect to time. FIG. 13 shows a portion of a pressurized cell geometry for the outer core surface 30, depicting the pressure (P), radius (r), and thickness (t) parameters. The hoop stress equation is as follows:

Hoop Stress=(Pressure*radius)/thickness     (1)

This equation is valid until the cell touches the expanded face sheet, after which each side of the cell forms an individual corner radius.

The allowable dynamic stress is a function of the die temperature and the strain rate sensitivity for the material of the intermediate assembly 10 (Ti-6-22-22 in the preferred embodiment) at its forming temperature. To calculate the geometry changes, the stress variable is replaced with the strain rate multiplied by the material modulus. The strain rate sensitivities for materials are well documented in the technical literature and can be calculated for specific materials by performing a "Cone Forming" test to establish this constant. Once the variables have been calculated, the equation can be rewritten as a function of the input variable, pressure, with respect to time:

$P(t)$=(radius/thickness)*(modulus)*(strain constant)     (2)

The pressure input can now be plotted over time by calculating the changes in sheet thickness and cell radii. These changes also dictate the rate of forming within the internal cell geometry, so that the degree of forming can be predicted mathematically. By predicting the shape of the internal cells, the new information can be continuously updated and input back into the equations to develop the required forming parameter inputs.

The range that the strain rate must be kept is critical because if the rate is either too fast or too slow the material will experience excessive thinning and a rupture will occur. Calculating the pressure inputs to stay within the superplastic strain rate of a given material at the varying cell heights and material thicknesses is an empirical task, depending upon the specific material being utilized and the specific finished configuration desired, and involves fairly extensive, though routine, computer modeling.

Having established the pressure schedule by mathematical means, the intermediate assembly 10 may now be loaded into the machine steel die 12. The die 12 has the desired external airfoil-shaped geometry as its internal cavity 62. The die 12 is then coated (e.g. sprayed) with a release agent such as Boron Nitrate which facilitates removal of the finished airfoil-shaped structure after forming. Each of the gas inlet lines 53 are capable, by means of the gas management unit 64, of adding or venting pressure between the core sheets 14 and 16 and between the facial component 57 and the core assembly 56. Once the part and die are securely loaded into the tool, the hydraulic pressure of the press must be adjusted to maintain a pressure differential between the internal die cavity 62 and the external face of the die to keep the die closed. The input temperature of the die 12 is increased from a loading temperature which may range from about 500° F., at a rate of about 3 degrees per minute, until the ideal forming temperature (about 1500°–1700° for Ti-6-22-22) is achieved.

Figure 16:
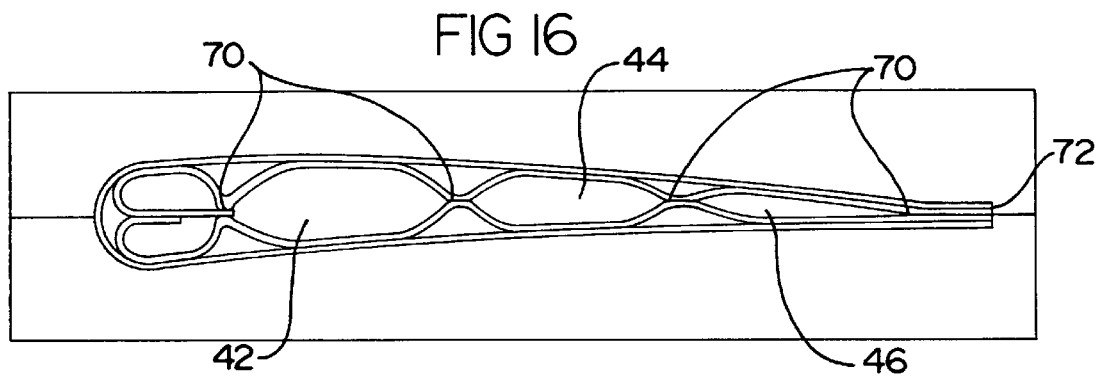
FIG. 16 is a cross-sectional elevational view similar to FIG. 12 showing the initiation of the outer core surface during the formation process of the present invention.

Referring to FIG. 12, it is typical that as the forming temperature is ramped up, the pressure in a face sheet cavity 66 is increased to initiate forming. The geometric simplicity and lack of superplastic straining involved with pushing the face sheet 54 out to the die contour (interior walls 68 of die 12 which define cavity 62) allows the operator the option of initiating the forming at lower temperatures that have a narrower superplastic strain rate sensitivity band. Although predicting the forming history of the face sheet 54 is more difficult at lower non-constant temperatures, the lack of overall material elongation increases the margin for successful forming. FIG. 16 shows the face sheet 54 formed out to the die surface 68.

As the face sheet 54 forms, pressure in the core sheets 14, 16 is held at a constant value by the gas management unit 64 until the optimum temperature is reached. Adequate pressure is held to keep the sheets apart and prevent the inside surfaces from sticking. As the temperature approaches 1600° F., the pressure in the core cells is increased. Wherever there is a row of spotwelds 23, a reaction point is provided for the core sheets 14, 16 to wrap back around the weld nuggets 70 (shown in FIG. 16), as the pressure in the core cells increases, thereby developing a web or spar at that location. Thus, the location of the weld nuggets 70 dictates the final internal web geometry of the airfoil-shaped structure. As shown in FIG. 4, the spotwelds run in both the longitudinal and lateral directions. Thus, both longitudinal and lateral webs may be formed by the above described process, depending upon whether a longitudinally or laterally oriented weld nugget is involved, though only the formation of lateral webs is shown in the figures depicting the fabrication process for the sake of simplicity. The relative pressure differential between each of the core cells is a critical parameter that must be maintained so that movement of the web location does not occur. The process of the present invention uses two sets of forming pressures, one directed into the middle of the core assembly 56 and one directed between the facial component 57 and the core assembly 56. The pressure between the facial component 57 and the core assembly 56, referred to as the face sheet pressure ($P_f$), forms the face sheet 54 against the forming die 12. The core assembly pressure ($P_c$) is always greater than the face sheet pressure ($P_f$). The pressure differential between $P_f$ and $P_c$ forms the core of the core assembly 56. Because spot welding is utilized, the core assembly pressure ($P_c$) communicates with each of the cells equally by communication between weld nuggets 70.

Viewing FIG. 15, a typical cell geometry is shown. An unbalanced force system in the X direction causes excessive material thinning. A balanced system is easy to achieve for the core arrangement because both edges of the intermediate assembly 10 are restrained from movement by the clamping pressure of the dies. As long as the spotweld spacing is equal, the radii of the cells remain equal and the webs have no difficulty forming.

Difficulties in forming the inventive airfoil-shaped structure are present due to the unique seamless, continuous leading edge design of the structure. Thus, the design includes the outer core surfaces 30, which have been wrapped back around 180°. This permits all of the edges of the sheets to protrude out of only three sides of the forming die 12: at the structure trailing edge and first and second sides. The leading edge therefore is continuous, having no seam.

Like face sheet 54, the simplicity of the outer core surface 30 allows formation out to face sheet 54 at a fairly rapid rate. Once the outer core surface 30 has contacted the face sheet 54, as shown in FIG. 16, diffusion bonding will occur and movement within forming the die 12 will be restricted. As the leading edge side of the outer core sheets continues forming, the reaction vector of the internal core sheets increases as the forming angle flattens out to become parallel with the X axis. This reaction vector is held in place by the internal pressure of the outer core sheets and will provide a measurable force to react with one side of the inner core sheets at cell 42. The other side is reacted through cells 44 and 46 (best seen in FIG. 16) where that load is finally transmitted into the clamped trailing edge 72. As the pressure is increased in cell 42, it will decrease in the X direction and increase in the Y direction.

Again viewing FIG. 16, formation of the internal core geometry continues until the radius at the web/skin interface begins to close. The diffusion bonding cycle then begins to promote grain growth across the material interface. Without intending to be bound by theory, under these conditions of elevated temperature and pressure the intermetallic transfer of grain boundaries activates the solid state molecular bonding required for superior part strength and the reduction and potential elimination of stress concentrations caused by joining methods.

Figure 17:
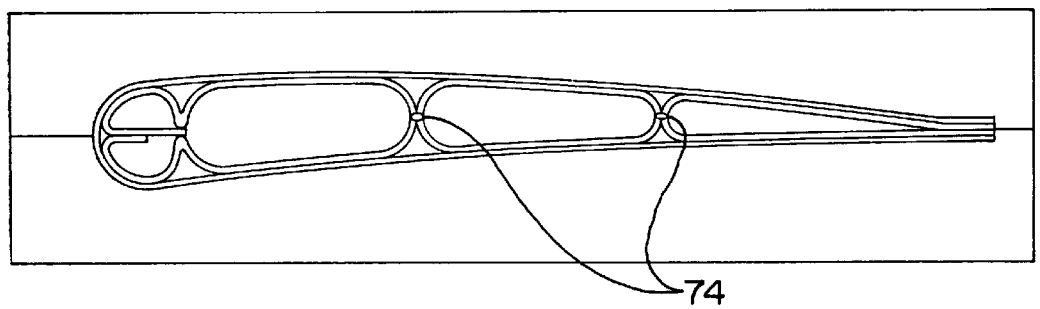
FIG. 17 is a cross-sectional elevational view similar to FIG. 12 showing the outer core surface formation.

FIG. 17 shows an advanced stage of forming where the core sheet web radii begin to gradually grow smaller, and the core pressure can be incrementally increased because the flow stresses in the material are a function of the radius at any given pressure. In this stage, the inner core surfaces 28 fold back over the weld nuggets 70 and diffusion bond together. As the cell webs 74 become vertical and the corner radius decreases, the core pressure is elevated until a maximum of about 250 psi is reached. This will be the pressure differential between the two material interfaces that is required to diffusion bond the material and promote grain growth across the boundary. After holding this pressure condition and bumping the temperature up to about 1700° F. for two hours the diffusion bonding and forming portion of the hot forming operation are complete and the tool temperatures can be lowered.

The temperature at which the part is removed from the tool impacts on the final dimensional stability of the part. Due to the difference in thermal expansion coefficients of the steel die and the titanium part, the die 12 will contract around the part as it cools. Since the part is still highly formable at elevated temperatures, the overall machining factor should be determined for the steel forming die. Typically, the die is machined at a factor slightly less than 1.0.

Figure 18:
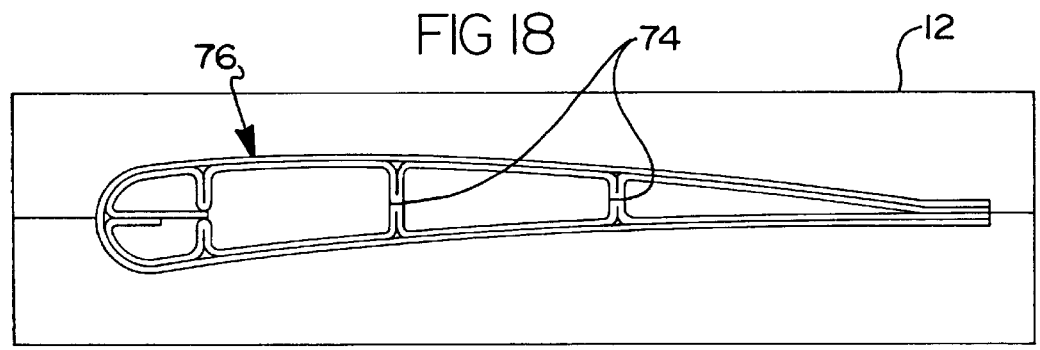
FIG. 18 is a cross-sectional elevational view similar to FIG. 12 showing the airfoil-shaped structure positioned within the die after diffusion bonding is complete.

The final geometry is pictured in the steel die 12 in FIG. 18. A gradual cool down is used to maintain the thermal stability of the die 12. As the part temperature approaches about 1400° F. the modulus of the titanium becomes adequate to permit removal of the airfoil-shaped structure 76 from the die 12 without damaging it. When the structure 76 is removed it should be placed in an insulated container to eliminate any warping condition that may be caused by preferential cooling of an exposed surface. The blade will now cool rapidly due to the large cooling area relative to its small mass. As the temperature nears 500° F., the gas inlet lines can be pinched off and welded closed. The hot forming operation is now complete.

Cleaning and Trimming Operation

During the SPF/DB cycle, the outer surface of the face sheet 54 is exposed to the atmospheric conditions present between forming die surface 68 and intermediate assembly 10. Titanium tends to be a relatively highly reactive material at temperatures above 1200° F. This causes it to soak up impurities at the surfaces. To eliminate these impurities, a removal operation is used to remove the impurities, e.g. by chemically removing about 3 to 5 mils from the outer part surfaces. The "White Layer", as it is commonly referred to, is not present within the web passages of the finished component, because it only comes in contact with the inert gas during the fabrication phase at elevated temperatures. After chemical milling a final machining operation is used to trim the component edges down to their net dimensions.

Figure 19:
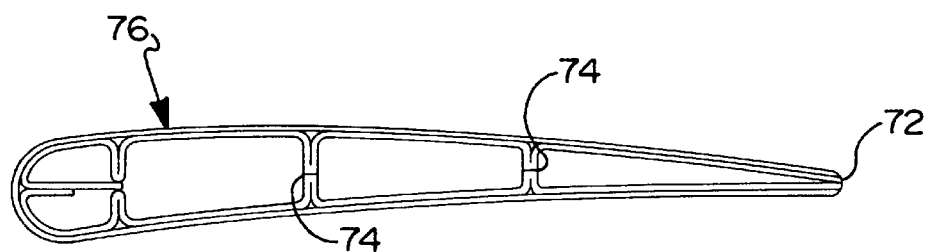
FIG. 19 is a cross-section of the trimmed airfoil-shaped structure as finally formed by the process of the present invention.

A cross-section of the completed structure 76 is shown in FIG. 19 with its trailing edge 72 machined down to its final shape. Although the individual lines of the titanium sheets are shown in the figure, all the surfaces that contact one another are diffusion bonded together. Thus, the outer core surface 30 for the first core sheet 14 is bonded to the face sheet first portion inner surface 54e, while the outer core surface 30 for the second core sheet 16 is bonded to the face sheet second portion inner surface 54f. Each of the core sheet and face sheet ends are bonded together to form a trailing edge 72 of the blade. Therefore, the component will essentially react to the loading environment as a single piece of annealed titanium material.

Figure 20:
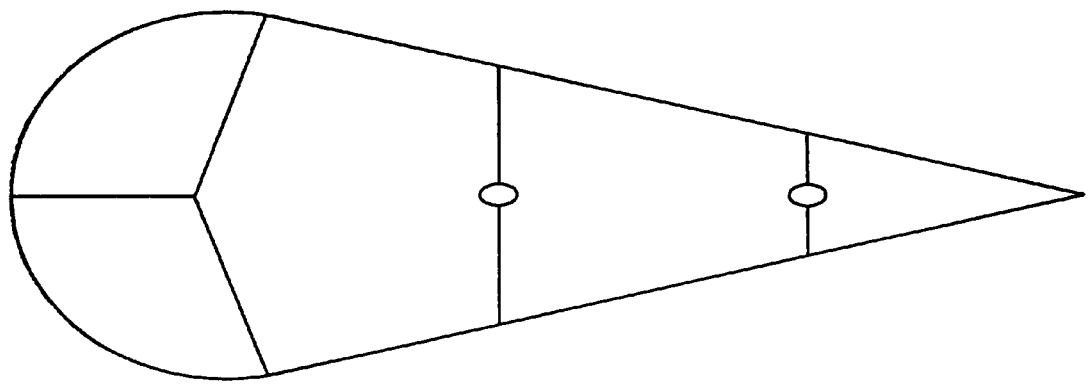
FIG. 20 is a cross-sectional view showing the airfoil-shaped structure of the present invention having a single web reinforced leading edge of a first embodiment.
Figure 21:
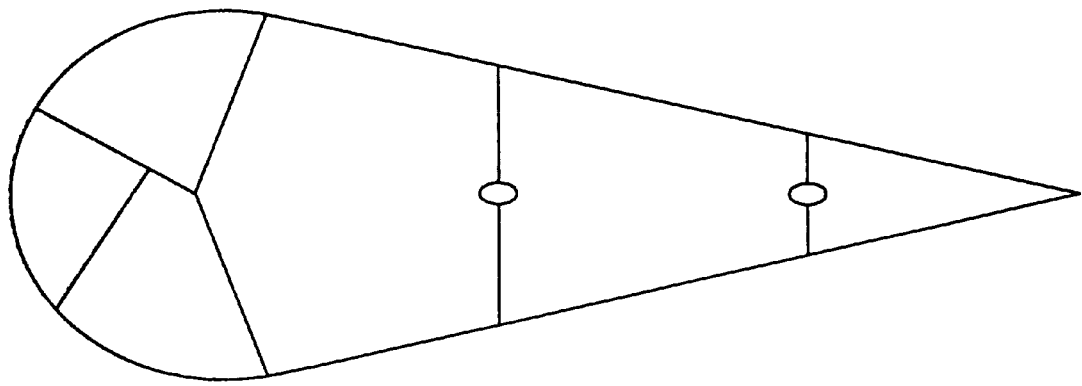
FIG. 21 is a cross-sectional view showing the airfoil-shaped structure of the present invention having multiple web reinforced leading edge of a second embodiment.

FIG. 20 is a schematic illustration of the web configuration obtained by the core structure of the first embodiment. FIG. 21 is a schematic illustration of the web configuration obtained by the core structure of the second embodiment.

The foregoing discussion discloses and describes merely an exemplary embodiment of the present invention. One skilled in the art will readily recognize from such discussion, and from accompanying drawings and claims, that various changes, modifications and variations can be made therein without departing from the spirit and scope of the invention as defined in the following claims.

What is claimed is:

1. A method of making an airfoil-shaped structure having a leading edge and a trailing edge, said method comprising the steps of:
    (a) forming a core assembly having sequentially connected together first, second, third and fourth core sheets;
    (b) forming a facial component being defined by a face sheet;
    (c) securing said core assembly inside said facial component, thereby forming an intermediate assembly;
    (d) placing said intermediate assembly into an airfoil-shaped die cavity; and
    (e) superplastically forming an airfoil-shaped structure having predetermined design parameters by heating said airfoil-shaped die cavity and selectively pressurizing a plurality of cells in said intermediate assembly, said plurality of cells being at least partially defined by a plurality of internal structural webs reinforcing said leading edge of said airfoil-shaped structure, said step of superplastically forming an airfoil-shaped structure having a single core assembly forming pressure and a single facial component forming pressure.

2. The method of claim 1 wherein each of said first, second, third and fourth core sheets includes a leading end, a trailing end, a first side, a second side, an upper surface and a lower surface, said step of forming a core assembly further comprising the steps of:
    (a) engaging said lower surface of said first core sheet with said upper surface of said second core sheet, said lower surface of said second core sheet with said upper surface of said third core sheet, and said lower surface of said third core sheet with said upper surface of said fourth core sheet;
    (b) securing together said first, second, third and fourth core sheets, wherein said trailing end of said first core sheet is attached to said leading end of said second core sheet, said trailing end of said second core sheet is attached to an intermediate portion of said third core sheet, and said leading end of said third core sheet is attached to said trailing end of said fourth core sheet, wherein said first and fourth core sheets are longer than said second and third core sheets;
    (c) adding at least one gas passageway into each of said first, second, third and fourth core sheets;

(d) backwardly bending said leading ends of said first and fourth core sheets approximately 180° such that said leading ends of said first and fourth core sheets are aligned, wherein each of said first and fourth core sheets thereby forms an inner core surface and an outer core surface;

(e) securing said first and fourth core sheets to said third core sheet; and (f) rolling an intermittent pattern of spotwelds onto said first and fourth core sheets, thereby forming an internal geometric web, said plurality of cells in said intermediate assembly being at least partially defined by said internal geometric web.

3. The method of claim 1 wherein said face sheet includes first and second ends and first and second surfaces, said step of forming said facial component further comprising the step of a bending said face sheet approximately 180 degrees at its centerline such that said first and second ends are aligned and said first surface defines an inner surface of said facial component and said second surface defines an outer surface of said facial component.

4. The method of claim 1 wherein said step of securing said core assembly inside said facial component further comprising the steps of:

(a) securing aligned first and second ends of said face sheet to aligned leading ends of said first and fourth core sheets;

(b) forming a plurality of gas inlets in said facial structure; and (c) sealing a remaining peripheral portion of said intermediate assembly, thereby creating said plurality of cells in said intermediate assembly, said plurality of cells including at least one face sheet cell and at least two core sheet cells located within said at least one face sheet cell.

5. The method of claim 1 wherein said first, second, third and fourth core sheets and said face sheet are made of the same SPF/DB material, said step of superplastically forming an airfoil-shaped structure further comprising the steps of:

(a) increasing the temperature within said airfoil-shaped die cavity to an ideal forming temperature for said SPF/DB material of said face sheet and said first, second, third and fourth core sheets;

(b) increasing the gas pressure in said at least one face sheet cell as the temperature in said die cavity is increased, thereby outwardly expanding said face sheet until it contacts an airfoil-shaped forming surface surrounding said die cavity; and (c) pressurizing said at least two core sheet cells, thereby forming an outer core surface of each of said first and fourth core sheets, said outer core surface being outwardly expanded to said face sheet.

6. The method of claim 5 further comprising the step of selectively increasing the core pressure and temperature as said outer core surface is outwardly expanded, thereby enabling contacting surfaces of said face sheet and each of said first and fourth core sheets to properly diffusion bond together and form said plurality of internal structural webs from said first, second, third and fourth core sheets.

7. A method of making an airfoil-shaped structure having a leading edge and a trailing edge, said method comprising the steps of:

(a) forming a core assembly having selectively connected together first and second core sheets;

(b) forming a facial component being defined by a face sheet;

(c) inserting said core assembly inside of said facial component, thereby forming an intermediate assembly;

(d) placing said intermediate assembly into an airfoil-shaped die cavity; and (e) superplastically forming an airfoil-shaped structure having predetermined design parameters by heating said airfoil-shaped die cavity and selectively pressurizing a plurality of cells in said intermediate assembly, said plurality of cells being at least partially defined by an internal structural web which reinforces said leading edge, said step of superplastically forming an airfoil-shaped structure having a single core assembly forming pressure and a single facial component forming pressure.

8. The method of claim 7 wherein said face sheet includes first and second ends and first and second surfaces, said step of forming said facial component further comprising the step of a bending said face sheet approximately 180 degrees at its centerline such that said first and second ends are aligned and said first surface defines an inner surface of said facial component and said second surface defines an outer surface of said facial component.

9. The method of claim 7 wherein said step of securing said core assembly inside said facial component further comprises the steps of:

(a) securing aligned first and second ends of said face sheet to aligned leading ends of said first and second core sheets;

(b) forming a plurality of gas inlets in said facial structure; and (c) sealing a remaining peripheral portion of said intermediate assembly, thereby creating said plurality of cells in said intermediate assembly, said plurality of cells including at least one face sheet cell and at least two core sheet cells located within said at least one face sheet cell.

10. The method of claim 9 wherein said step of securing aligned first and second ends of said face sheet to aligned leading ends of said first and second core sheets is accomplished by roll-seam welding.

11. The method of claim 7 wherein said first and second core sheets and said face sheet are made of the same SPF/DB material, said step of superplastically forming an airfoil-shaped structure further comprising the steps of:

(a) increasing the temperature within said airfoil-shaped die cavity to an ideal forming temperature for said SPF/DB material of said face sheet and said first and second core sheets;

(b) increasing the gas pressure in said at least one face sheet cell as the temperature in said die cavity is increased, thereby outwardly expanding said face sheet until it contacts an airfoil-shaped forming surface surrounding said die cavity; and (c) pressurizing said at least two core sheet cells, thereby forming an outer core surface of each of said first and second core sheets, said outer core surface being outwardly expanded to said face sheet.

12. The method of claim 11 further comprising the step of selectively increasing the core pressure and temperature as said outer core surface is outwardly expanded, thereby enabling contacting surfaces of said face sheet and each of said first and second core sheets to properly diffusion bond together and forming said internal structural web from said center core section.

13. The method of claim 7 wherein each of said first and second core sheets includes a leading end, a trailing end, a first side, a second side, an upper surface and a lower surface, said step of forming a core assembly further comprising the steps of:

(a) engaging said lower surface of said first core sheet with said upper surface of said second core sheet;

(b) securing together said first and second core sheets, wherein an intermediate portion of said first core sheet is attached to said trailing end of said second core sheet, thereby creating a center core section being defined by a portion of said first core sheet between said intermediate portion and said trailing end, said internal structural web being defined by said center core section;

(c) placing at least one gas passageway into said center core section;

(d) backwardly bending said leading ends of said first and second core sheets such that said leading ends of said first and second core sheets are aligned, wherein each of said first and second core sheets thereby forms an inner core surface and an outer core surface;

(e) securing said first and second core sheets to said center core section; and (f) rolling an intermittent pattern of spotwelds onto said first and second core sheets, thereby forming an internal geometric web, said plurality of cells in said intermediate assembly being at least partially defined by said internal geometric web.

14. The method of claim 13 wherein said step of securing together said first and second core sheets is accomplished by roll-seam welding.

15. The method of claim 13 wherein said step of securing said first and second core sheets to said center core section is accomplished by roll-spotwelding.

16. The method of claim 13 wherein said intermittent pattern of spotwelds is rolled in a direction extending from said first sides of said first and second core sheets to said second sides of said first and second core sheets.

17. The method of claim 13 wherein said intermittent pattern of spotwelds is rolled in at least two directions extending from said first sides of said first and second core sheets to said second sides of said first and second core sheets and from said trailing ends of said first and second core sheets to said roll spotwelds securing said first and second core sheets to said center core section.

* * * * *